J. ROBERTSON.
Rope-Clamping Hook.
No. 221,361. Patented Nov. 4, 1879.
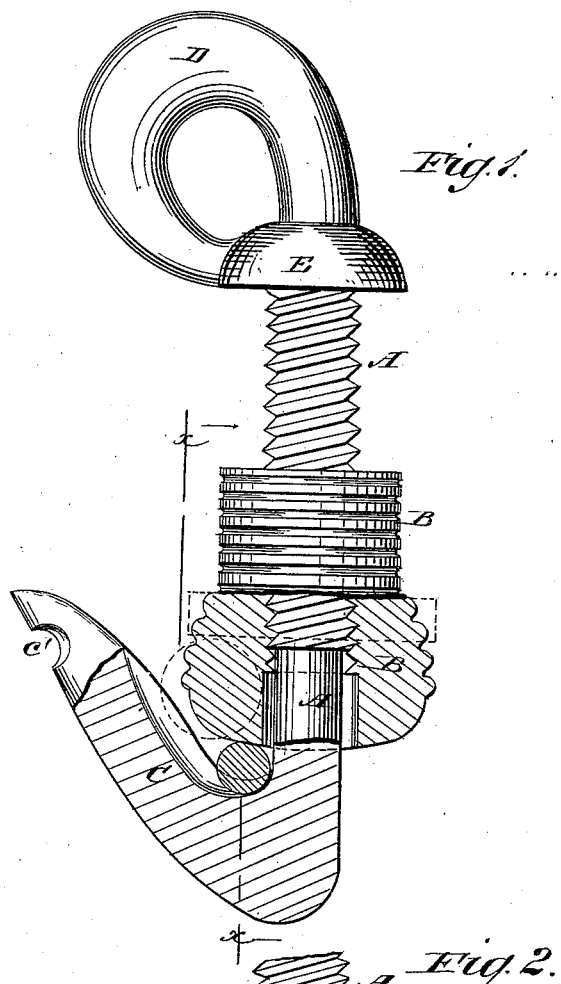
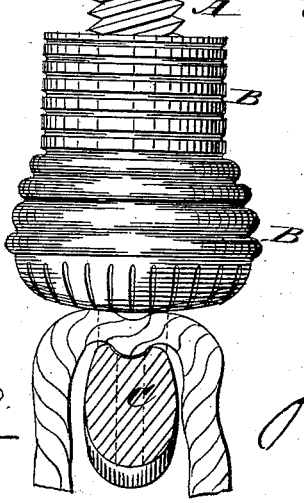
WITNESSES: Francis McArdle, Michael Hyland
INVENTOR: James Robertson

UNITED STATES PATENT OFFICE.

JAMES ROBERTSON, OF EAST CAMBRIDGE, MASSACHUSETTS.

IMPROVEMENT IN ROPE-CLAMPING HOOKS.

Specification forming part of Letters Patent No. 221,361, dated November 4, 1879; application filed April 18, 1879.

*To all whom it may concern:*

Be it known that I, JAMES ROBERTSON, of East Cambridge, in the county of Middlesex and State of Massachusetts, have invented an Improved Rope-Clamping Hook, of which the following is a specification.

Figure 1 is a side view of my improved hook, partly in section to show the construction. Fig. 2 is a front view of the same, partly in section through the line $x\,x$, Fig. 1, and partly broken away to show its form and mode of use.

Similar letters of reference indicate corresponding parts.

The object of this invention is to furnish an improved implement which shall be so constructed as to hold the rope or chain attached to the hook firmly and securely, which shall be simple in construction and convenient and reliable in use.

The invention consists in the hook formed of the screw-shank, the cylindrical nut made with an enlarged lower end, the hook-arm having a groove cavity or slot in or through the arm longitudinally in its upper or inner side, the eye, and the head, as hereinafter fully described.

A represents the shank of the hook, which has one or more screw-threads or spiral grooves formed upon it, into which fit the screw-threads or equivalent of the nut B.

The nut B is made large and cylindrical, is enlarged at its lower end, and is corrugated or roughened, so that it can be firmly and conveniently grasped to turn. The lower end of the nut B is rounded off, as shown in Figs. 1 and 2, or otherwise shaped and roughened to tighten by friction.

Upon the lower end of the shank A is formed a hook-arm, C, which projects obliquely upward and forward, more or less, as its purpose requires, and is grooved, or concaved, or slotted through longitudinally upon the inner or upper side, as shown in Figs. 1 and 2.

In the end part of hook C is formed a notch or eye, $c'$, to receive a mousing to fasten the nut B down, when required, as for instance, when the hook is used for swinging a ship's yard or boom.

Upon the upper end of the shank A is formed an eye, D, which is projected forward, as shown in Fig. 1, to bring the point of support directly over the base of the hook C, as shown in Fig. 1. An enlargement or head, E, is at the base or point of union of the eye D with the shank A, for convenience in holding it to use.

With this construction, when a rope or chain has been put on the hook C and the nut B screwed down upon it, as illustrated in Figs. 1 and 2, the enlarged lower end of the said nut B will press the said rope or chain into the cavity of the hook C, clamping it in such a way that a strain upon one end of the rope or chain will turn the nut down on itself closer, thus only wedging it more snugly between the said nut and sides of the cavity in the hook, and causing it to be held more firmly and securely.

With a suitable-sized hook of this construction, ropes or chains of any size from a thread or tape upward will be held firmly and securely and without any liability to slip. The tendency of a rope or chain to grow smaller when strained is met by the nut closing by the friction of the strain.

The principal features of this invention being the three opposing points of contact between the nut and sides of the cavity in the hook, entitles it to the name of the "trinity bond hook."

Having thus fully described my invention, I claim as new and desire to secure by Letters Patent—

A hook for hoisting and other purposes formed of the screw-shank A, the cylindrical nut B, made with an enlarged lower end, the hook-arm C, having a groove, cavity, or slot formed longitudinally in or through from its upper or inner side, the eye D, and the head E, substantially as herein shown and described.

JAMES ROBERTSON.

Witnesses:
C. H. PERRY,
C. H. MOULTON.